(12) United States Patent
Scott et al.

(10) Patent No.: US 10,559,130 B2
(45) Date of Patent: Feb. 11, 2020

(54) DISPLAYING IMAGE DATA BEHIND SURFACES

(71) Applicant: MICROSOFT TECHNOLOGY LICENSING, LLC, Redmond, WA (US)

(72) Inventors: Jason Bradley Scott, Bellevue, WA (US); Omer Bilal Orhan, Redmond, WA (US); John Copic, Redmond, WA (US); Shawn Crispin Wright, Sammamish, WA (US); Jeffrey Kohler, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 170 days.

(21) Appl. No.: 14/841,415

(22) Filed: Aug. 31, 2015

(65) Prior Publication Data

US 2017/0061691 A1    Mar. 2, 2017

(51) Int. Cl.
  *G06T 19/00*   (2011.01)
  *G06T 15/60*   (2006.01)
(52) U.S. Cl.
  CPC .......... *G06T 19/006* (2013.01); *G06T 15/60* (2013.01)
(58) Field of Classification Search
  None
  See application file for complete search history.

(56) References Cited

U.S. PATENT DOCUMENTS

| | | | |
|---|---|---|---|
| 6,633,304 B2 | 10/2003 | Anabuki et al. | |
| 8,659,624 B2 | 2/2014 | Matsui | |
| 9,324,190 B2* | 4/2016 | Bell | H04N 13/0203 |
| 2012/0212509 A1* | 8/2012 | Benko | G03B 35/00 |
| | | | 345/633 |
| 2013/0083173 A1* | 4/2013 | Geisner | G06F 3/013 |
| | | | 348/51 |
| 2013/0162676 A1* | 6/2013 | Taylor | G06T 7/004 |
| | | | 345/633 |

(Continued)

FOREIGN PATENT DOCUMENTS

CN    103823553 A    5/2014

OTHER PUBLICATIONS

Watson DG, "qualcomm vs string augmented reality demo", 2011, URL: https://vimeo.com/25566981.*

(Continued)

*Primary Examiner* — David H Chu
(74) *Attorney, Agent, or Firm* — Alleman Hall Creasman & Tuttle LLP (57) ABSTRACT

Examples are disclosed herein that relate to displaying image data configured to appear behind a real-world surface. One example provides, on a computing device including a display, a method including obtaining depth data representing a real-world scene, identifying a real-world surface of the real-world scene via the depth data, obtaining volumetric image data and surface image data, the volumetric image data configured to appear as being located in a volume behind the real-world surface, receiving a user input configured to remove an area of surface image data corresponding spatially to the real-world surface, and displaying at least a portion of the volumetric image data in a region in which the area of surface image data was removed.

19 Claims, 8 Drawing Sheets

(56) References Cited

U.S. PATENT DOCUMENTS

| | | | |
|---|---|---|---|
| 2013/0314398 A1 | 11/2013 | Coates et al. | |
| 2014/0002492 A1 | 1/2014 | Lamb et al. | |
| 2014/0043436 A1* | 2/2014 | Bell | H04N 13/0203 348/46 |
| 2014/0139639 A1* | 5/2014 | Wagner | H04N 13/0253 348/46 |
| 2014/0200863 A1* | 7/2014 | Kamat | G01C 15/00 703/1 |
| 2015/0215611 A1* | 7/2015 | Wu | H04N 13/0022 345/419 |
| 2016/0148433 A1* | 5/2016 | Petrovskaya | G06T 19/006 345/633 |
| 2016/0260441 A1* | 9/2016 | Muehlhausen | G06F 3/011 |

OTHER PUBLICATIONS

Bully Entertainment, "Dragon Window—Augmented Reality", 2011, URL: https://vimeo.com/21755381.*

Hughes, "Achieving Interactive-Time Realistic Illumination in Mixed Reality", 2004.*

Haller, "A real-time shadow approach for an Augmented Reality application using shadow volumes", 2003.*

Shachar Oz, "ToyZ: Augmented Reality Open World Game", May 14, 2015, URL: https://www.slideshare.net/shachar_oz/toys-published.*

Kotaku, "Minecraft Hololens demo at E3 2015 (amazing!)", Jun. 15, 2015, URL: https://www.youtube.com/watch?v=xgakdcEzVwg (Year: 2015).*

Bernd Fröhlich, "Consistent Illumination for Mixed Reality Szenarios", Retrieved on: May 22, 2015, Available at: https://www.uni-weimar.de/en/media/chairs/vr/research/real-time-rendering/consistent-illumination-for-mixed-reality-szenarios/.

Hayden, Scott, "Microsoft's 'Mixed Reality' HoloLens Garners Mixed Reviews, Incredible Potential Diminished by Small Field of View", Jan. 26, 2015, Available at: http://www.roadtovr.com/microsofts-mixed-reality-hololens-garners-mixed-reviews-incredible-apps-diminished-small-field-view/.

Konttinen, et al., "Real-time Illumination and Shadowing by Virtual Lights in a Mixed Reality Setting", Published on: Jul. 14, 2005, Available at: http://citeseerx.ist.psu.edu/viewdoc/download?doi=10.1.1.296.2753&rep=rep1&type=pdf.

MacIntyre, Blair, "Authoring 3D Mixed Reality Experiences: Managing the Relationship Between the Physical and Virtual Worlds", In Proceedings of ACM SIGGRAPH and Eurographics Campfire: Production Process of 3D Computer Graphics Applications—Structures, Roles and Tools, Snowbird, UT, Jun. 1, 2002, 5 pages.

Naemura, et al., "Virtual Shadows in Mixed Reality Environment Using Flashlight-like Devices", In Proceedings of Trans Virtual Reality Society of Japan, vol. 7, No. 2, Retrieved on: May 22, 2015, 11 pages.

Glockner, et al., "Augmented Reality in Logistics Changing the way we See Logistics", Published on: Jun. 30, 2014, Available at: http://www.dhl.com/content/dam/downloads/g0/about_us/logistics_insights/csi_augmented_reality_report_290414.pdf.

Benko, et al., "Collaborative Mixed Reality Visualization of an Archaeological Excavation", In Proceedings of the International Symposium on Mixed and Augmented Reality, Nov. 2, 2004, 9 pages.

Mine, et al., "Projection-Based Augmented Reality in Disney Theme Parks", In Journal of IEEE Computer, vol. 45, No. 7, Jul. 2012, 9 pages.

Opprecht, Kurt, "Virtual Dig Brings Ruins to Surface", Published on: Apr. 17, 1997, Available at: http://archive.wired.com/science/discoveries/news/1997/04/3206.

Plafke, James, "Haptic Holographic Display Turns Thin Air Into a Touchscree", Published on: Oct. 28, 2014, Available at: http://www.extremetech.com/extreme/193032-haptic-holographic-display-turns-thin-air-into-a-touchscreen.

"First Hands-on: The VOID, a Mixed Reality Experience That Blends Real and Virtual", Published on: Mar. 16, 2015, Available at: http://www.roadtovr.com/first-hands-on-the-void-a-mixed-reality-experience-that-blends-real-and-virtual/.

"Turn any Surface into an Intuitive, Holographic Workspace", Published on: Apr. 21, 2015, Available at: http://challengepost.com/software/insite-augmented-reality-workspace.

Hughes, et al., "Achieving Interactive-Time Realistic Illumination in Mixed Reality", In Proceedings of Army Science Conference, Nov. 29, 2004, 7 pages.

* cited by examiner

DISPLAYING IMAGE DATA BEHIND SURFACES

BACKGROUND

Display technologies may allow a user to experience immersive virtual environments and/or a mix of real and virtual environments. For example, some computing devices may include see-through displays that allow the presentation of augmented reality imagery via the display of virtual objects superimposed over a real-world environment.

SUMMARY

Examples are disclosed herein that relate to displaying image data configured to appear behind a real-world surface. One example provides, on a computing device including a display, a method including obtaining depth data representing a real-world scene, identifying a real-world surface of the real-world scene via the depth data, and obtaining volumetric image data and surface image data, wherein the volumetric image data is configured to appear as being located in a volume behind the real-world surface. The method further includes receiving a user input configured to remove an area of surface image data corresponding spatially to the real-world surface, and displaying at least a portion of the volumetric image data in a region in which the area of surface image data was removed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Current augmented reality imagery may take the form of surface augmentations displayed over real-world surfaces. Such augmentations may change the appearance of the real-world surface, but may not be interactive to reveal additional imagery configured to appear to be located within or behind the real-world object. Accordingly, examples are disclosed herein that relate to displaying image data configured to appear as being located behind real-world surfaces. As described in more detail below, the disclosed examples may allow volumetric image data to initially appear to be concealed behind a surface and then revealed by user inputs. This may provide a visually stimulating interactive experience of virtually "digging into" a real world object that is not provided by surface augmentation alone. Further, lighting effects based upon both real and virtual features may be applied to such image data.

Figure 1:
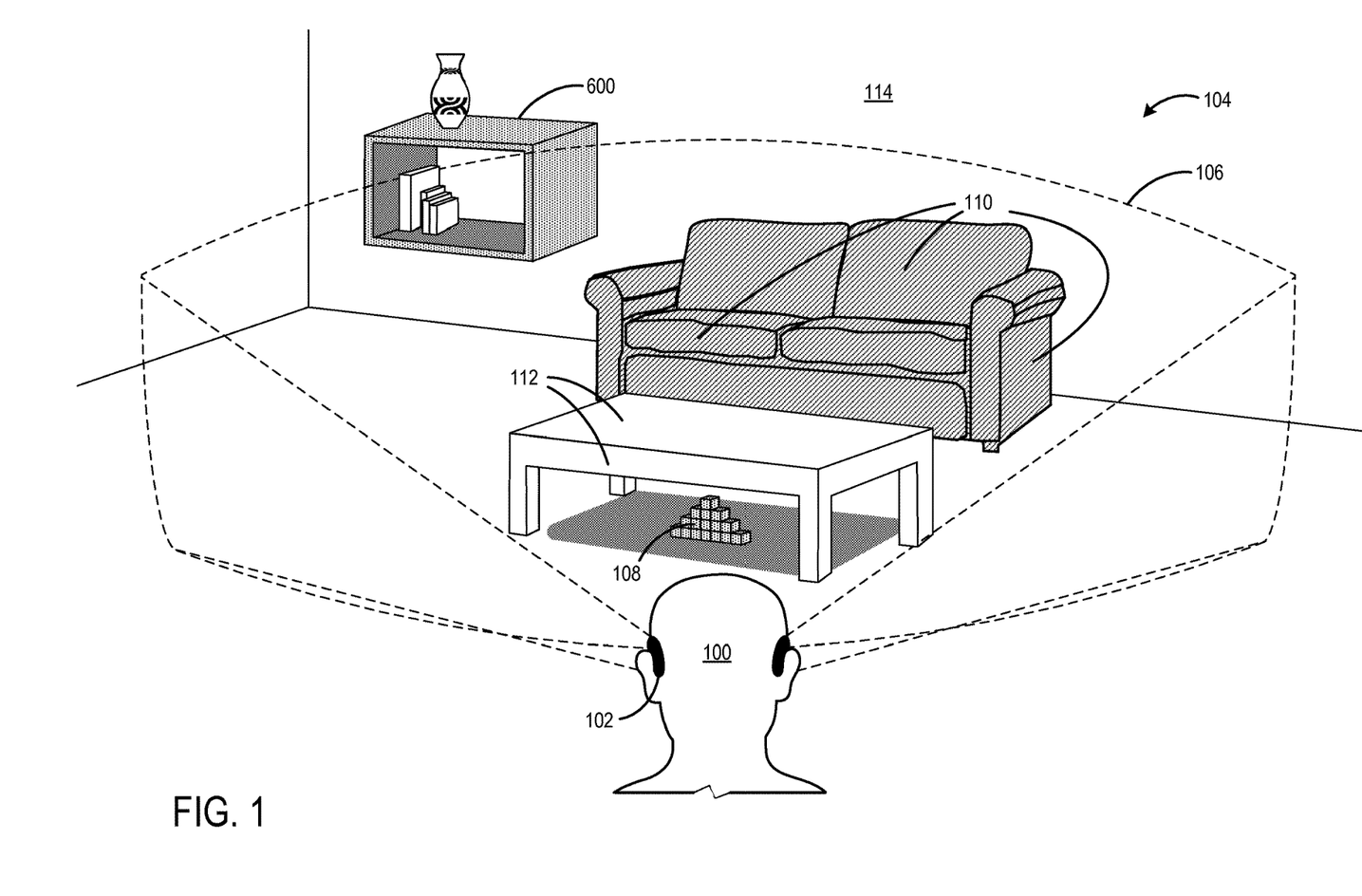
FIG. 1 shows an example use environment for an augmented reality display device, and illustrates example augmented reality imagery.

FIG. 1 shows an example use scenario in which a user 100 is wearing an augmented reality display device 102 that presents virtual image data together with a see-through view of a real-world scene 104 within an augmented reality field of view 106. In this example, the augmented reality display device 102 is displaying a virtual object 108 positioned under a table within the real-world scene 104. As described in more detail below, the augmented reality display device 102 is also displaying an outermost portion of volumetric image data, which is also referred to herein as surface data. This surface data is located spatially at the surface of one or more real-world objects in the scene, but may in some instances not be rendered such that it does not occlude a view of the real world surface. Further, the surface image data can be removed by user input to reveal rendered volumetric image data apparently located within the volumes behind the surfaces.

The augmented reality display device 102 may include one or more outward-facing image sensors configured to acquire image data of the real-world scene 104. Examples of such image sensors include, but are not limited to, depth sensor systems (e.g. time-of-flight or structured light camera(s)), visible light image sensors, and infrared image sensors. The augmented reality display device may obtain a virtual representation of the real-world scene 104 for the presentation of augmented reality images. For example, the augmented reality display device may obtain a three-dimensional mesh of the real-world scene 104 constructed from depth data acquired via an on-board depth sensor (e.g. by using a simultaneous localization and mapping method). In other examples, the augmented reality display device may obtain previously acquired and stored depth data of the real-world scene 104, either stored locally or remotely.

After obtaining the virtual representation (e.g. three-dimensional mesh) of the real-world scene 104, the augmented reality display device 102 may identify one or more real-world surface(s) of the real-world scene via the virtual representation. For example, the augmented reality display device 102 may identify couch surfaces 110, table surfaces 112, and a wall surface 114, as non-limiting examples of identifiable real-world surfaces. Such surfaces may be identified in any suitable manner, such as by classification of real-world objects using image and/or depth data, or by user-designated labels.

The augmented reality display device 102 may obtain image data corresponding to the virtual representation of the real-world scene 104. The image data obtained may include volumetric image data corresponding spatially to volumes behind the surfaces, and also surface image data, which is volumetric image data located at the physical surface. In FIG. 1, the augmented reality display device 102 may obtain surface image data corresponding to the couch surfaces 110, table surfaces 112, wall surface 114, and any other suitable identified real-world surfaces, and also volumetric image data located behind any of these surfaces and/or others. The volumetric image data may represent the real-world scene 104 in any suitable manner, such as in the form of repeating geometric (e.g. cubic or other suitable shape) units configured to fill the volumes behind the surfaces.

The surface image data is displayed by the augmented reality display device 102 as aligned over the real-world surfaces in the real-world scene, such that the user 100 views the surface image data as the currently perceived real-world surfaces. As such, the augmented reality display device 102 may be configured to track movements of the user 100 (e.g. head movements, body movements, and/or eye movements) to continually update display of the surface image data to help ensure proper alignment between the displayed surface image data and the viewable real-world surfaces. Such tracking and updating may be performed in any suitable manner, including but not limited to via motion sensors, gaze detectors, and/or outward-facing cameras disposed on the augmented reality display device 102.

The volumetric image data is configured to appear as being located in a volume behind a real-world surface. As examples, volumetric image data may be located to appear as occupying the interior volume of the couch behind couch surfaces 110, within the interior volume of the table behind table surfaces 112, in the space beneath the table (e.g. displayed virtual object 108), and/or behind the wall surface 114. Thus, some portions of obtained volumetric image data may not initially be visible, such as portions concealed by the real-world surfaces and the surface image data, while other portions may be initially visible, such as virtual object 108.

Figure 2:
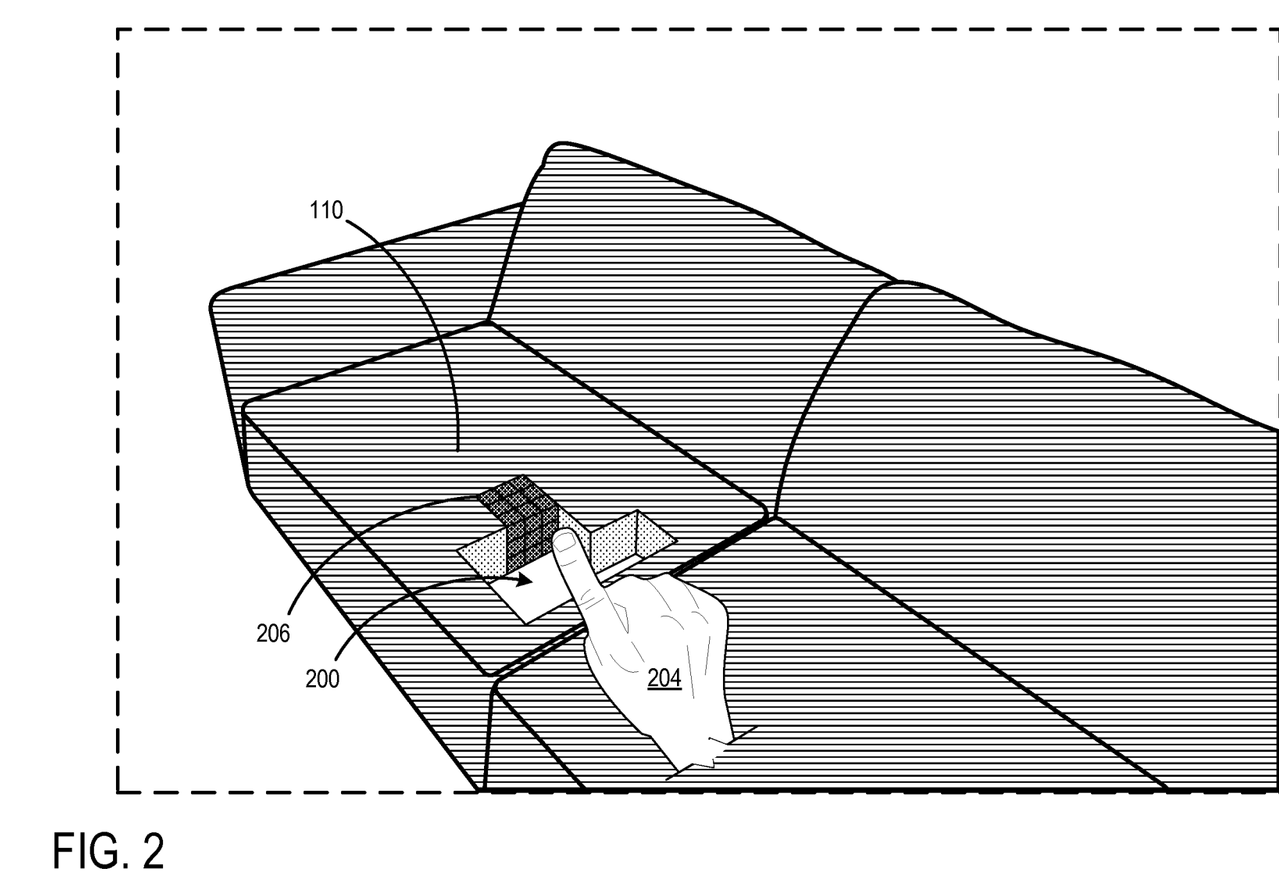
FIG. 2 shows example volumetric image data revealed by a user input.

The augmented reality display device 102 may recognize various user interactions or other events to reveal volumetric image data initially concealed behind a surface. FIG. 2 illustrates an example of volumetric image data 200 which was not visible in FIG. 1 being revealed by a user gesture, represented via a hand 204. The hand 204 is shown as revealing the volumetric image data 200 behind couch surface 110. In this example, the gesture input is shown as controlling a virtual cursor 206. The virtual cursor 206 thus acts as a "digging" tool allowing the user 100 to virtually dig through the couch surface 110. Via the virtual cursor 206, the gesture input removes an area of surface image data that corresponds spatially to the couch surface 110. Upon "digging" the surface image data away, the volumetric image data 200 is displayed in the region in which the area of the surface image data was removed, thus giving the appearance that an interior volume behind the couch surface 110 has been revealed. It will be understood that any suitable event may trigger the revealing of the volumetric image data 200, such as deployment of virtual explosives, etc.

In some implementations, the volumetric image data may be rendered prior to display. In such implementations, the volumetric image data may be rendered when initially produced or otherwise obtained (e.g. when cubes or other shapes corresponding to various virtual structures, such as dirt, rocks, water, air, and the like are first associated with locations in the real-world scene). Surface image data may be left unrendered where it is desired to initially conceal the volumetric image data, or may be rendered where it is desired for the surface image data to be initially viewable. In other implementations, the volumetric image data 200 may remain initially unrendered, and may be rendered in real time when revealed by user input or other event.

As mentioned above, the augmented reality display device 102 may be configured to apply lighting effects. Such effects may be used to make real-world surfaces appear as being lit by virtual light sources, and also to make virtual objects appear as being lit by real-world light sources. To apply real-world lighting effects, as one example, the augmented reality display device 102 may model virtual light sources that match the locations and lighting characteristics of real-world light sources. As another example, one or more predetermined virtual light source(s) may be utilized, e.g. a top-down light source.

Figure 3:
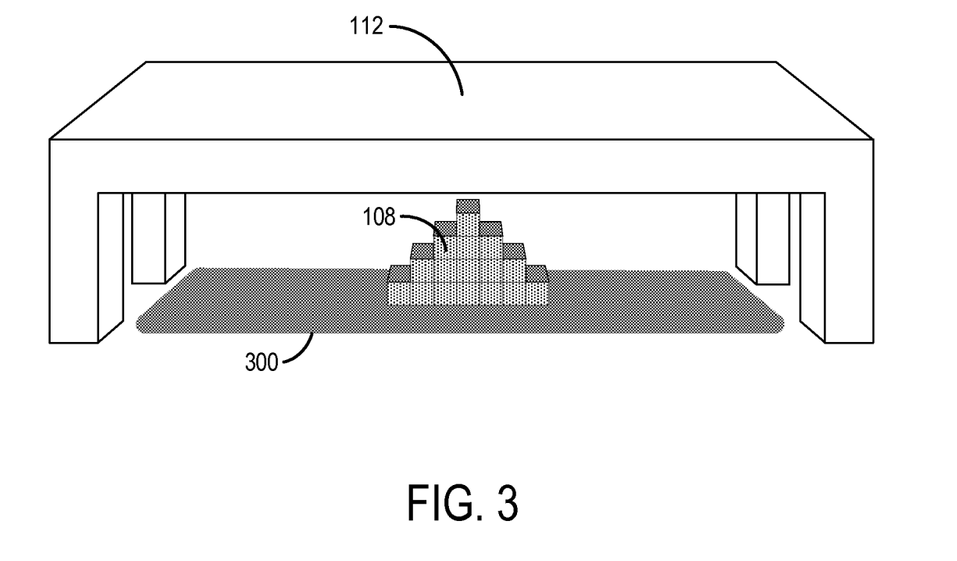
FIG. 3 shows example augmented reality image data displayed while applying real-world lighting effects.
Figure 4:
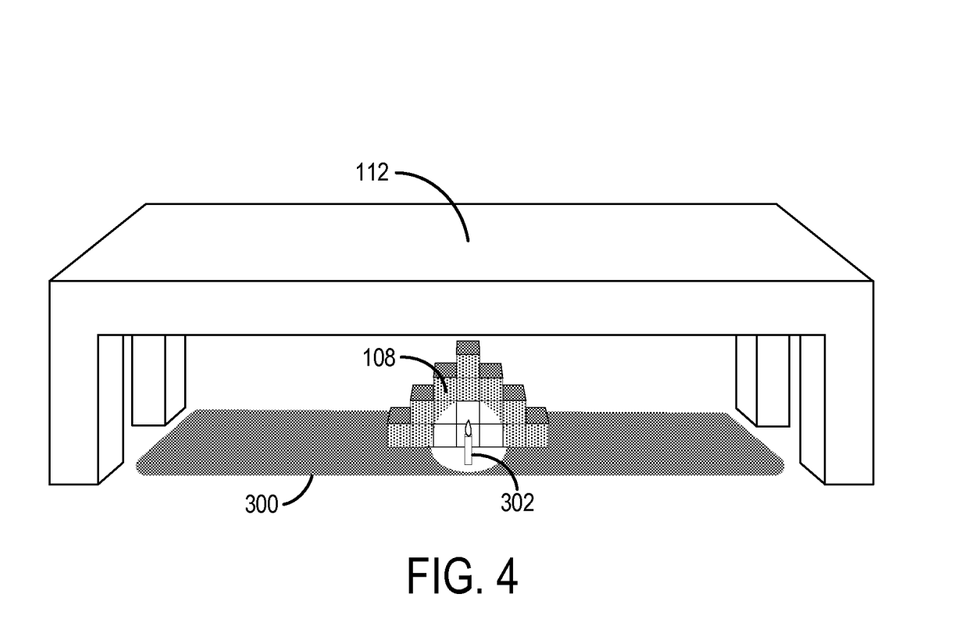
FIG. 4 shows example augmented reality image data having lighting effects based on virtual and real-world light sources.
Figure 5:
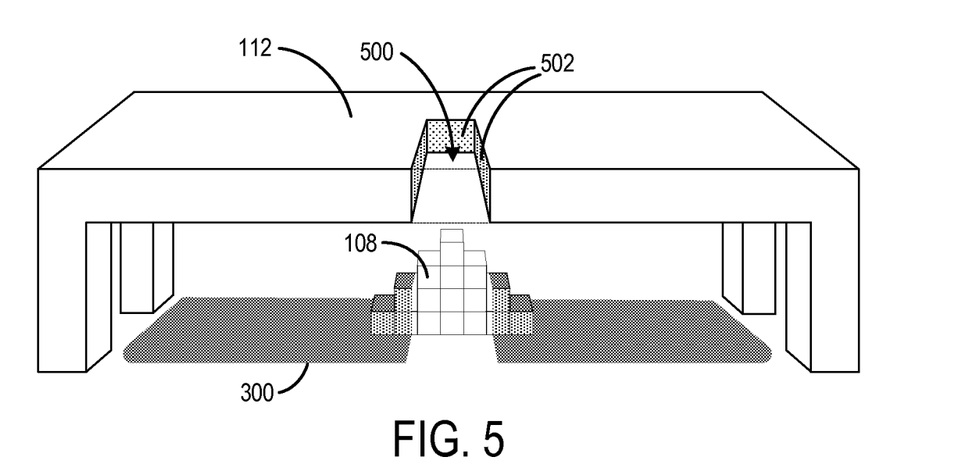
FIG. 5 shows example augmented reality image data having lighting effects based on a user interaction removing a region of volumetric image data.

FIGS. 3-5 illustrate examples of lighting effects that may be applied to augmented reality image data. First, FIG. 3 shows a view of the virtual object 108 of FIG. 1, being displayed as volumetric image data beneath the table surface 112. As shown, the table surface 112 casts a shadow 300 due to overhead lighting in the room. As such, the virtual object 108 may be displayed based on such real-world lighting effects, e.g. by applying the shadow 300 cast by the table surface 112 onto the virtual object 108. The shadow 300 may be displayed by virtually casting the shadow onto surface image data (whether the surface image data itself is rendered or unrendered) corresponding to the floor surface. The surface image data also may be augmented using local virtual light sources. FIG. 4 shows an example virtual torch 302, for example, as placed by a user, that may alter the appearance of the virtual object 108 and the shadow 300. Light from a virtual light source may be applied to a real-world surface as well, e.g. by applying the lighting effect to surface image data.

FIG. 5 shows an example display of image data after receiving a user input removing an area 500 of surface image data corresponding spatially to the table surface 112. In this case, volumetric image data 502 corresponding to the interior volume behind the table surface 112 is displayed upon removal of the area 500, e.g. via user interaction. Additionally, the augmented reality display device 102 may apply real-world lighting effects illuminating the shadow 300 and the virtual object 108, as if real overhead light were passing through area 500. This may provide a realistic effect that a portion of the table has been removed.

Figure 6:
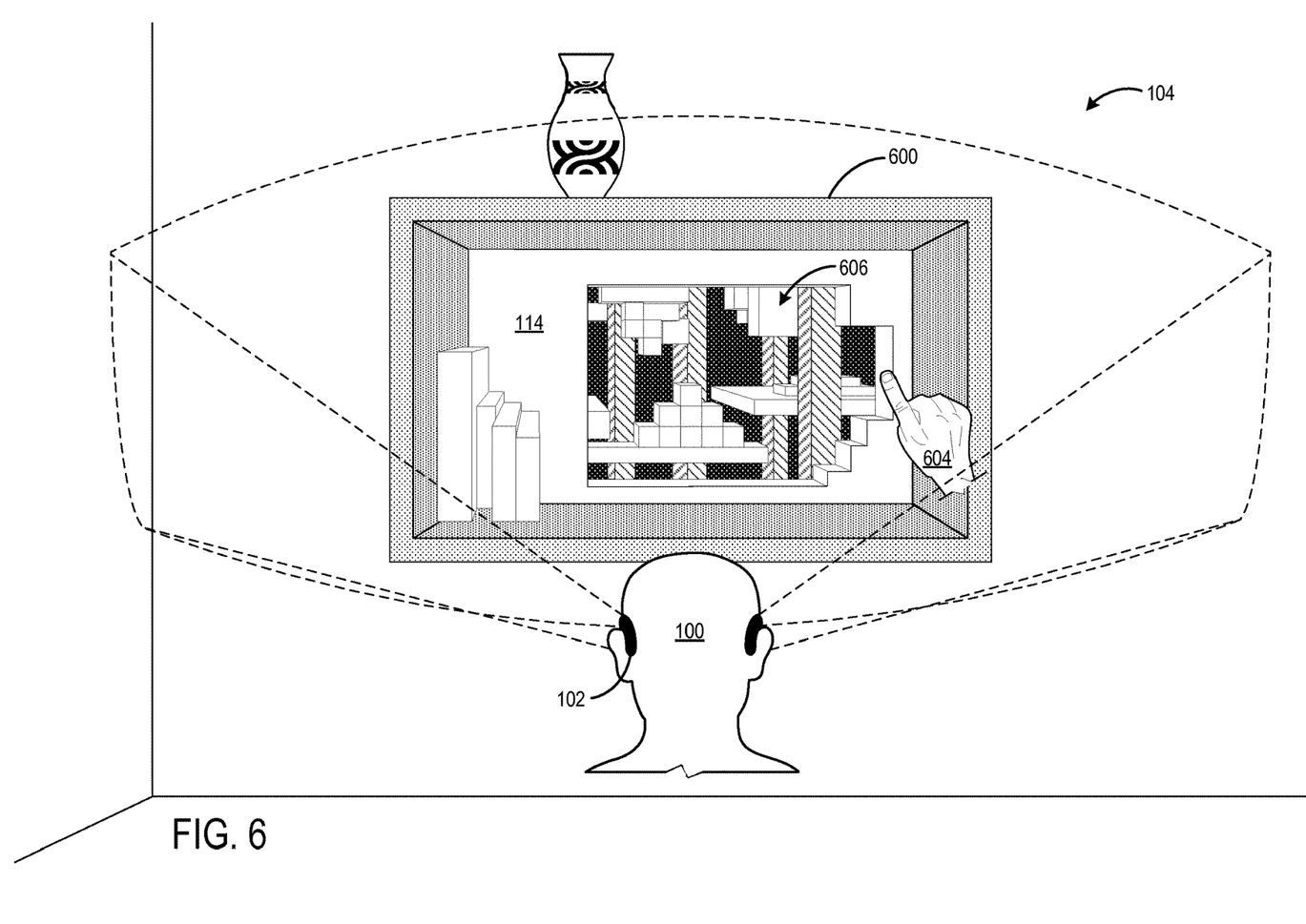
FIG. 6 shows another example of volumetric image data revealed by a user input.

FIG. 6 depicts another example of displaying volumetric image data behind a real-world surface. Here, the user 100 views a real-world shelf 600 mounted on the wall surface 114 of the real-world scene 104. The user 100 performs a gesture interaction via a hand 604 to remove an area of surface image data corresponding spatially to the wall surface 114, and the augmented reality display device 102 displays volumetric image data 606 in a region within the removed area. As mentioned above, the displayed data may be pre-rendered or rendered in real time. Further, the user 100 may continue to interact with the volumetric image data 606 to reveal additional portions of the volumetric image data 606 and provide an effect of "digging" through the wall surface 114.

The augmented reality display device 102 may be configured to display the volumetric image data 606 based on the user's position to provide a parallax effect. For example, as the user 100 moves around the shelf 600, the augmented reality display device 102 may track the position of the user 100 and change the apparent location and perspective of the volumetric image data 606 based on the user's perspective, thus providing a realistic sense of depth.

Figure 7A:
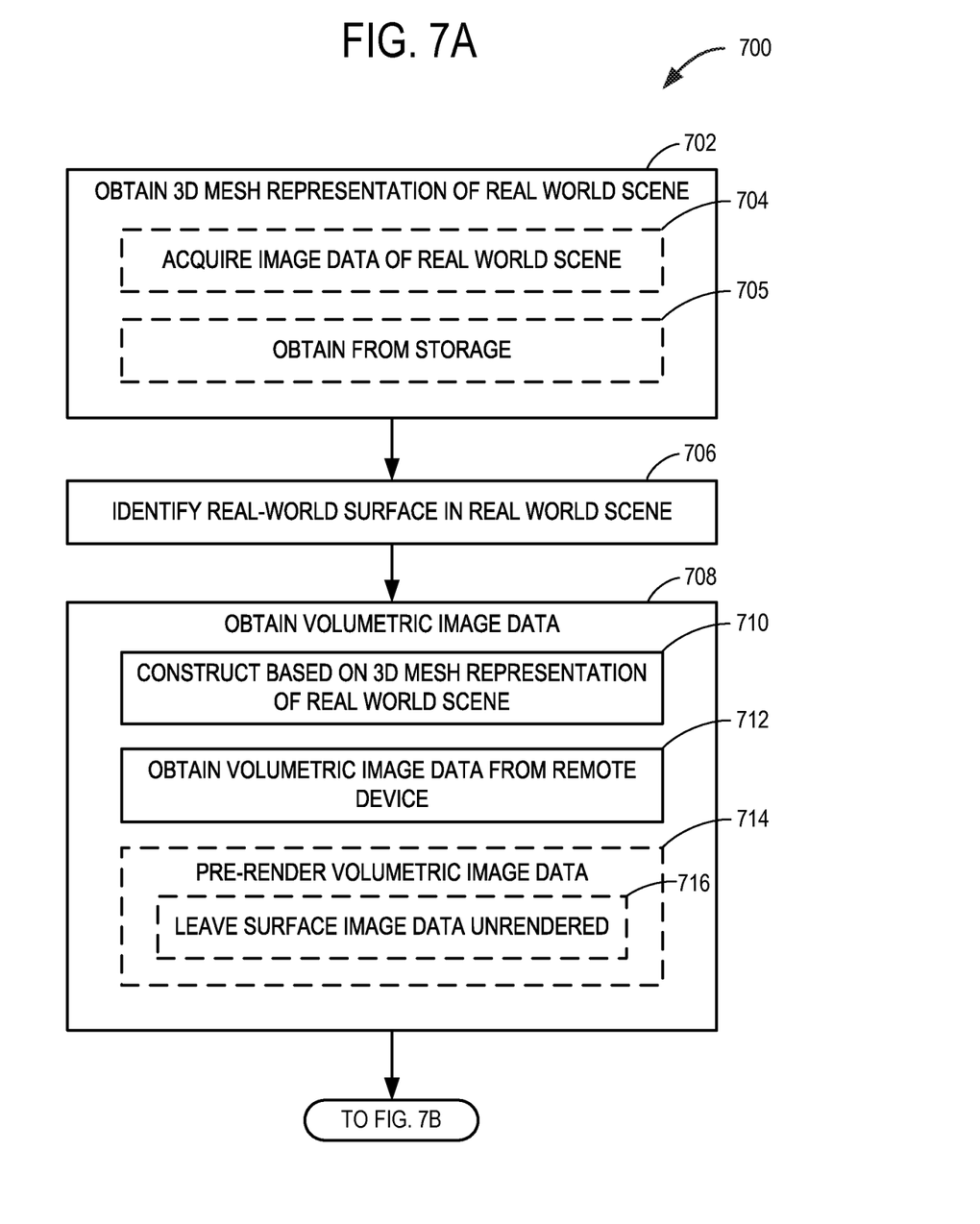
FIGS. 7A and 7B show an example method of displaying image data on an augmented reality display system.
Figure 7B:
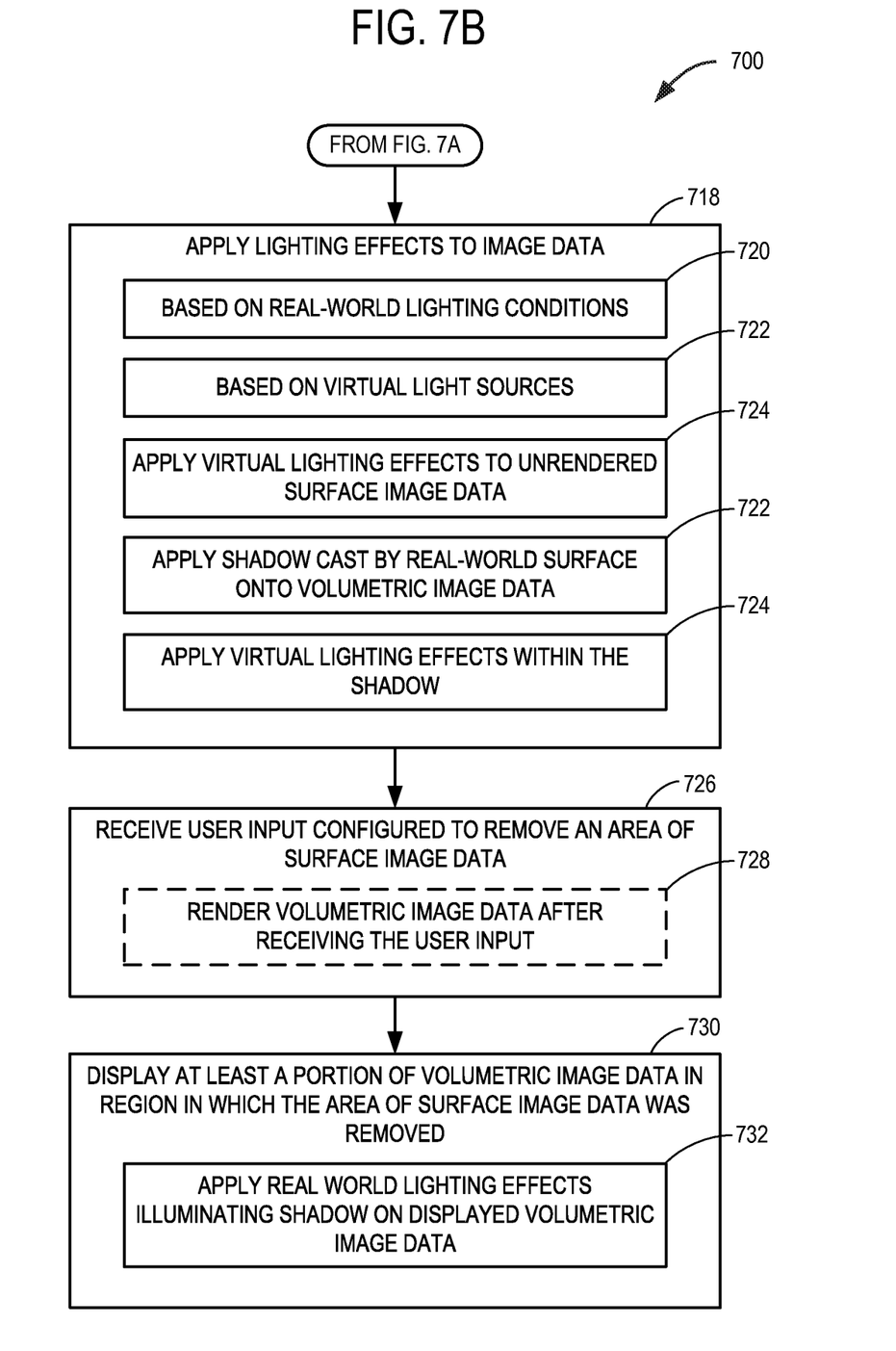

FIGS. 7A-7B show a flow diagram illustrating an example method 700 for displaying image data via a augmented reality display device. Method 700 includes, at 702, obtaining a three-dimensional mesh representation of a real-world scene. The three-dimensional mesh representation may be generated via image data acquired of the real-world scene, as shown at 704. For example, the mesh may be generated via a simultaneous localization and mapping algorithm as a user of an augmented reality display device comprising suitable sensors (e.g. one or more depth cameras, two-dimensional image sensors, motion sensors, global positioning system sensors, etc.) moves within the real-world scene. Alternatively or additionally, a previously-acquired three-dimensional mesh representation may be retrieved from storage, either locally or remotely, as shown at 705. Method 700 further includes, at 706, identifying a real-world surface of the real-world scene, and at 708, obtaining volumetric image data including surface image data. As described above, the volumetric image data is configured to appear as being located in a volume behind the real-world surface, and the surface image data, which is an outermost portion of the volumetric image data, corresponds spatially to the real-world surface. The surface image data may be unrendered to hide the underlying volumetric data until revealed via receipt of a user input removing the surface image data.

The volumetric image data and the surface image data may be constructed based on the three-dimensional mesh representation of the real-world scene, as shown at 710. For example, as described above, the volumetric image data may be constructed to fill determined volumes in the real-world scene. The volumetric image data may be constructed as repeating units configured to fill the volumes, such as blocks that each have a predetermined appearance, or may be constructed in any other suitable manner. For example, the volumetric image data also may take the form of voxels. In other examples, the volumetric image data may be obtained from a remote device, as shown at 712, rather than constructed remotely. In such examples, the mesh representation of the real-world scene may be sent to the remote device. The volumetric image data optionally may be pre-rendered, at 714, and the surface image data may optionally be left unrendered, at 716.

Continuing with FIG. 7B, method 700 further includes applying lighting effects to the image data, at 718. For example, lighting effects may be applied that are based on real-world lighting conditions, at 720, as well as based on virtual light sources that are a part of the augmented reality image data, at 722. Lighting effects that are based on real-world light sources may be applied, for example, by modeling the real-world light sources with virtual light sources positioned at similar locations and having similar light characteristics. Method 700 additionally may include, at 724, applying virtual lighting effects to unrendered surface image data. This may give the appearance that virtual lighting sources effect the light cast on real-world objects. Method 700 further may include, at 722, applying a shadow cast by the real-world surface onto the volumetric image data, as illustrated by example in FIG. 3, and at 724, applying virtual lighting effects within the shadow, as illustrated by example in FIG. 4.

A user may choose to interact with the images. As such, method 700 further includes, at 726, receiving a user input configured to remove an area of augmented reality image data. The area removed may be rendered volumetric or surface image data (where the surface image data is the outermost extent of the volumetric image data that corresponds spatially to the real-world surface), or the area may be unrendered surface image data. Any suitable user input may indicate the removal of surface or volumetric image data, including but not limited to a gesture input, an eye gaze input, a voice input, and/or an input via a virtual cursor.

Method 700 includes, at 730, displaying at least a portion of the volumetric image data in a region in which the area of the surface image data was removed, such as the volumetric image data 200 displayed as appearing behind the couch surface 110 or the volumetric image data 606 behind the wall surface 114. Where the area removed includes unrendered surface image data, removing the area to expose volumetric data may produce the effect of digging into a real-world surface to review underlying structures. Further, lighting effects may be applied to the newly-displayed volumetric image data based upon any relevant real-world and/or virtual light sources, as indicated at 732.

Figure 8:
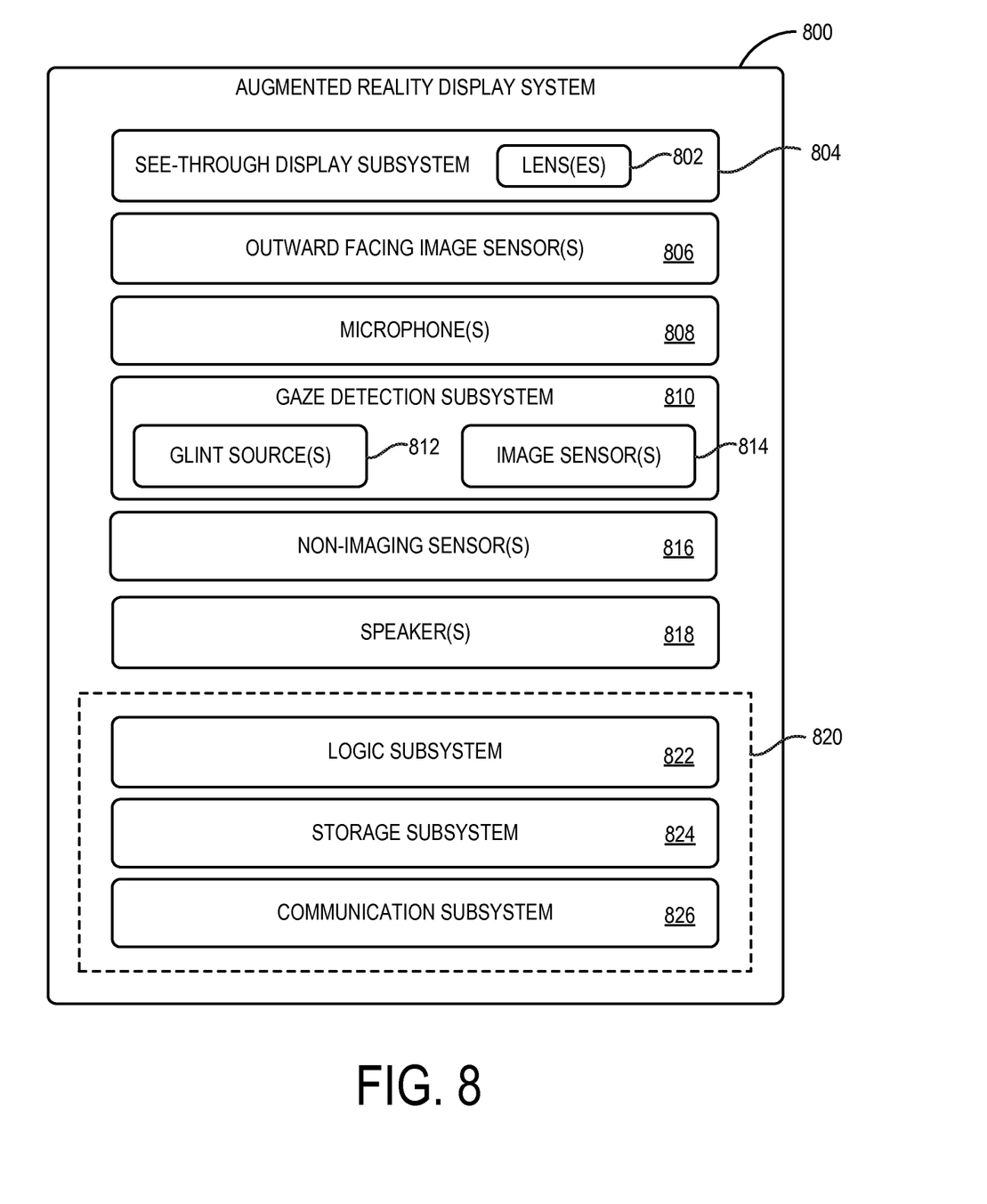
FIG. 8 shows a block diagram of an example augmented reality display system.

FIG. 8 shows a block diagram of an example augmented reality display system 800. Display system 800 includes one or more lenses 802 that form a part of a see-through display subsystem 804, such that images may be displayed via lenses 802 (e.g. via projection onto lenses 802, waveguide system(s) incorporated into lenses 802, and/or in any other suitable manner). Display system 800 further includes one or more outward-facing image sensors 806 configured to acquire images of a real-world environment being viewed by a user, and may include one or more microphones 808 configured to detect sounds, such as voice commands from a user or ambient sounds. Outward-facing image sensors 806 may include one or more depth sensor(s) and/or one or more two-dimensional image sensor(s) (e.g. RGB image sensors and/or infrared image sensors). In other examples, augmented reality display system 800, may display augmented reality images via a viewfinder mode for an outward-facing image sensor, rather than via a see-through display subsystem.

Display system 800 may further include a gaze detection subsystem 810 configured to detect a gaze of a user for detecting user input interacting with displayed image data, for example when display system 300 is implemented as a head-mounted display system, as mentioned above. Gaze detection subsystem 810 may be configured to determine gaze directions of each of a user's eyes in any suitable manner. For example, in the depicted embodiment, gaze detection subsystem 810 comprises one or more glint sources 812, such as infrared light sources configured to cause a glint of light to reflect from each eyeball of a user, and one or more image sensor(s) 814, such as inward-facing sensors, configured to capture an image of each eyeball of the user. Changes in the glints from the user's eyeballs and/or a location of a user's pupil as determined from image data gathered via the image sensor(s) 814 may be used to determine a direction of gaze. Further, a location at which gaze lines projected from the user's eyes intersect the external display may be used to determine an object at which the user is gazing (e.g. a displayed virtual object and/or real background object). Gaze detection subsystem 810 may have any suitable number and arrangement of light sources and image sensors. In other examples, gaze detection subsystem 810 may use any other suitable gaze tracking technology, or may be omitted.

Display system 800 also may include additional sensors, as mentioned above. For example, display system 800 may include non-imaging sensor(s) 816, examples of which may include but are not limited to an accelerometer, a gyroscopic sensor, a global positioning system (GPS) sensor, and an inertial measurement unit (IMU). Such sensor(s) may help to determine the position, location, and/or orientation of the display device within the environment, which may help provide accurate 3D mapping of the real-world environment for use in displaying image data appropriately in an augmented reality setting.

Motion sensors, as well as microphone(s) 808 and gaze detection subsystem 810, also may be employed as user input devices, such that a user may interact with the display system 800 via gestures of the eye, neck and/or head, as well as via verbal commands. It will be understood that sensors illustrated in FIG. 8 are shown for the purpose of example and are not intended to be limiting in any manner, as any other suitable sensors and/or combination of sensors may be utilized.

Display system 800 further includes one or more speaker(s) 818, for example to provide audio outputs to a user for user interactions. Display system 800 further includes a controller 820 having a logic subsystem 822 and a storage subsystem 824 in communication with the sensors, gaze detection subsystem 810, display subsystem 804, and/or other components. Storage subsystem 824 comprises instructions stored thereon that are executable by logic subsystem 822, for example, to receive and interpret inputs from the sensors, to identify location and movements of a user, to identify real objects in an augmented reality field of view and present augmented reality imagery therefore, to detect objects located outside a field of view of the user, and to present indications of positional information associated with objects located outside the field of view of the user, among other tasks.

Logic subsystem 822 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

The storage subsystem 824 includes one or more physical devices configured to hold instructions executable by the logic subsystem to implement the methods and processes described herein. When such methods and processes are implemented, the state of the storage subsystem 824 may be transformed—e.g., to hold different data.

The storage subsystem 824 may include removable and/or built-in devices. The storage subsystem 824 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 824 may include volatile, nonvolatile, dynamic, static, read/write, read-only, random-access, sequential-access, location-addressable, file-addressable, and/or content-addressable devices.

It will be appreciated that the storage subsystem 824 includes one or more physical devices. However, aspects of the instructions described herein alternatively may be propagated by a communication medium (e.g., an electromagnetic signal, an optical signal, etc.) that is not held by a physical device for a finite duration.

Aspects of the logic subsystem 822 and the storage subsystem 824 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The see-through display subsystem 804 may be used to present a visual representation of data held by storage subsystem 824. This visual representation may take the form of a graphical user interface (GUI) comprising volumetric image data. As the herein described methods and processes change the data held by the storage subsystem, and thus transform the state of the storage subsystem, the state of see-through display subsystem 804 may likewise be transformed to visually represent changes in the underlying data. The see-through display subsystem 804 may include one or more display devices utilizing virtually any type of technology. Such display devices may be combined with the logic subsystem 822 and/or the storage subsystem 824 in a shared enclosure, or such display devices may be peripheral display devices.

The communication subsystem 826 may be configured to communicatively couple the display system 800 with one or more other computing devices. The communication subsystem 826 may include wired and/or wireless communication devices compatible with one or more different communication protocols. As non-limiting examples, the communication subsystem 826 may be configured for communication via a wireless telephone network, or a wired or wireless local- or wide-area network. In some embodiments, the communication subsystem 826 may allow display system 800 to send and/or receive messages to and/or from other devices via a network such as the Internet.

It will be appreciated that the depicted display system 800 is described for the purpose of example, and thus is not meant to be limiting. It is to be further understood that the display system may include additional and/or alternative sensors, cameras, microphones, input devices, output devices, etc. than those shown without departing from the scope of this disclosure. For example, the display system 800 may be implemented as a virtual realty display system rather than an augmented reality system. Additionally, the physical configuration of a display device and its various sensors and subcomponents may take a variety of different forms without departing from the scope of this disclosure. Further, it will be understood that the methods and processes described herein may be implemented as a computer-application program or service, an application-programming interface (API), a library, and/or other computer program product. Such computer program products may be executable locally on the display system 800 or other suitable display system, or may be executable remotely on a computing system in communication with the display system 800.

Another example provides, on an augmented reality computing device comprising a display, a method, comprising obtaining depth data representing a real-world scene, identifying a real-world surface of the real-world scene via the depth data, obtaining volumetric image data and surface image data, the volumetric image data configured to appear as being located in a volume behind the real-world surface, and the surface image data corresponding spatially to the real-world surface, receiving a user input configured to remove an area of the surface image data, and displaying at least a portion of the volumetric image data in a region in which the area of surface image data was removed. The method may additionally or alternatively include obtaining the volumetric image data and the surface image data by constructing the volumetric image data and the surface image data based on the depth data representing the real-world scene. The method may additionally or alternatively include rendering the volumetric image data prior to receiving the user input. The method may additionally or alternatively include rendering the volumetric image data by rendering the volumetric image data based on real-world lighting effects. The method may additionally or alternatively include rendering the volumetric image data by rendering the volumetric image data based on virtual lighting effects. The method may additionally or alternatively include applying a shadow cast by the real-world surface onto the volumetric image data. The method may additionally or alternatively include applying virtual lighting effects within the shadow cast by the real-world surface. The method may additionally or alternatively include, after receiving the user input configured to remove the area of surface image data, applying real-world lighting effects illuminating the shadow on displayed volumetric image data. The method may additionally or alternatively include rendering the volumetric image data after receiving the user input. The method may additionally or alternatively include obtaining the volumetric image data by obtaining the volumetric image data from a remote device. The method may additionally or alternatively include applying virtual lighting effects to the surface image data. In the example, the volumetric image data may additionally or alternatively include blocks. The method may additionally or alternatively include acquiring image data of the real-world scene, and wherein obtaining the depth data representing the real-world scene comprises obtaining the depth data based on the image data.

Another example provides an augmented reality display system, comprising a display, a logic subsystem, and a storage subsystem comprising instructions executable by the logic subsystem to obtain a three-dimensional mesh representation of a real-world scene, identify a real-world surface of the real-world scene via the three-dimensional mesh representation, obtain volumetric image data and surface image data, the volumetric image data configured to appear as being located in a volume behind the real-world surface, and the surface image data corresponding spatially to the real-world surface, receive a user input configured to remove an area of the surface image data, and display at least a portion of the volumetric image data in a region in which the area of the surface image data was removed. The instructions executable to obtain the volumetric image data and the surface image data may additionally or alternatively include instructions executable to construct the volumetric image data and the surface image data based on the three-dimensional mesh representation of the real-world scene. The instructions may additionally or alternatively be executable to render the volumetric image data at the computing device prior to receiving the user input. The instructions may additionally or alternatively be executable to render the volumetric image data after receiving the user input. The instructions executable to obtain the volumetric image data may additionally or alternatively include instructions executable to obtain the volumetric image data from a remote device.

Another example provides a head-mounted display device, comprising a see-through display, an image sensor system, a logic subsystem, and a storage subsystem comprising instructions executable by the logic subsystem to acquire image data of a real-world scene via the image sensor system, obtain a three-dimensional mesh representation of the real-world scene based on the image data, identify a real-world surface of the real-world scene via the three-dimensional mesh representation, obtain rendered volumetric image data and surface image data, the rendered volumetric image data configured to appear as being located in a volume behind the real-world surface, and the surface image data corresponding spatially to the real-world surface, receive a user input configured to remove an area of the surface image data, and display at least a portion of the rendered volumetric image data in a region in which the area of the surface image data was removed. The instructions executable to obtain the rendered volumetric image data may additionally or alternatively include instructions executable to render volumetric image data based on real-world lighting effects.

It will be understood that the configurations and/or approaches described herein are presented for example, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On an augmented reality computing device comprising a display, a method, comprising:
    obtaining depth data representing a real-world scene;
    identifying a plurality of real-world surfaces of the real-world scene via the depth data;
    constructing volumetric image data and surface image data based on the depth data, the volumetric image data comprising a plurality of volumetric image data units filling at least a portion of a volume behind a real-world surface of the plurality of real-world surfaces, and the surface image data corresponding spatially to the real-world surface;
    receiving a first user input configured to remove an area of the surface image data;
    displaying at least a first portion of the volumetric image data in a first region in which the area of the surface image data was removed;
    receiving a second user input configured to remove the first portion of the volumetric image data by removing one or more of the volumetric image data units of the volumetric image data; and
    displaying at least a second portion of the volumetric image data in a second region revealed by removal of the one or more volumetric image data units.

2. The method of claim 1, further comprising rendering the volumetric image data prior to receiving the first user input.

3. The method of claim 2, wherein rendering the volumetric image data comprises rendering the volumetric image data based on real-world lighting effects.

4. The method of claim 2, wherein rendering the volumetric image data comprises rendering the volumetric image data based on virtual lighting effects.

5. The method of claim 2, further comprising applying a shadow cast by a real-world object onto the volumetric image data.

6. The method of claim 5, further comprising applying virtual lighting effects within the shadow.

7. The method of claim 5, further comprising, after receiving the first user input configured to remove the area of the surface image data, applying real-world lighting effects illuminating the shadow on displayed volumetric image data.

8. The method of claim 1, further comprising one or more of rendering the first portion of the volumetric image data after receiving the first user input and rendering the second portion of the volumetric image data after receiving the second user input.

9. The method of claim 1, wherein constructing the volumetric image data comprises obtaining the volumetric image data from a remote device.

10. The method of claim 1, further comprising applying virtual lighting effects to the surface image data.

11. The method of claim 1, wherein the volumetric image data comprises blocks.

12. The method of claim 1, further comprising acquiring image data of the real-world scene, and wherein obtaining the depth data representing the real-world scene comprises obtaining the depth data based on the image data.

13. An augmented reality display system, comprising:
a display;
a logic subsystem; and
a storage subsystem comprising instructions executable by the logic subsystem to
obtain a three-dimensional mesh representation of a real-world scene,
identify a plurality of real-world surfaces of the real-world scene via the three-dimensional mesh representation,
construct volumetric image data and surface image data, the volumetric image data comprising a plurality of volumetric image data units filling at least a portion of a volume behind a real-world surface of the plurality of real-world surfaces, and the surface image data corresponding spatially to the real-world surface,
receive a first user input configured to remove an area of the surface image data,
display at least a first portion of the volumetric image data in a first region in which the area of the surface image data was removed,
receive a second user input configured to remove the first portion of the volumetric image data by removing one or more of the volumetric image data units of the volumetric image data, and
display at least a second portion of the volumetric image data in a second region revealed by removal of the one or more volumetric image data units.

14. The augmented reality display system of claim 13, wherein the instructions executable to construct the volumetric image data and the surface image data comprise instructions executable to construct the volumetric image data and the surface image data based on the three-dimensional mesh representation of the real-world scene.

15. The augmented reality display system of claim 13, wherein the instructions are further executable to render the volumetric image data prior to receiving the first user input.

16. The augmented reality display system of claim 14, wherein the instructions are further executable to render the volumetric image data after receiving the first user input.

17. The augmented reality display system of claim 13, wherein the instructions executable to construct the volumetric image data comprise instructions executable to obtain the volumetric image data from a remote device.

18. A head-mounted display device, comprising:
a see-through display;
an image sensor system;
a logic subsystem; and
a storage subsystem comprising instructions executable by the logic subsystem to
acquire image data of a real-world scene via the image sensor system,
obtain a three-dimensional mesh representation of the real-world scene based on the image data,
identify a plurality of real-world surfaces of the real-world scene via the three-dimensional mesh representation,
construct rendered volumetric image data and surface image data, the rendered volumetric image data comprising a plurality of volumetric image data units filling at least a portion of a volume behind a real-world surface of the plurality of real-world surfaces, and the surface image data corresponding spatially to the real-world surface,
receive a first user input configured to remove an area of the surface image data,
display at least a first portion of the rendered volumetric image data in a first region in which the area of the surface image data was removed,
receive a second user input configured to remove the first portion of the rendered volumetric image data by removing one or more of the volumetric image data units of the rendered volumetric image data, and
display at least a second portion of the rendered volumetric image data in a second region revealed by removal of the one or more volumetric image data units.

19. The head-mounted display device of claim 18, wherein the instructions executable to construct the rendered volumetric image data comprise instructions executable to render volumetric image data based on real-world lighting effects.

* * * * *